(12) United States Patent
Ashrafi et al.

(10) Patent No.: US 12,242,332 B2
(45) Date of Patent: Mar. 4, 2025

(54) IDENTIFYING ROOT CAUSE ANOMALIES IN TIME SERIES

(71) Applicant: Oracle International Corporation, Redwood Shores, CA (US)

(72) Inventors: Shwan Ashrafi, Bellevue, WA (US); Michal Piotr Prussak, Kirkland, WA (US); Hariharan Balasubramanian, Redmond, WA (US); Vijayalakshmi Krishnamurthy, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 15 days.

(21) Appl. No.: 17/962,869

(22) Filed: Oct. 10, 2022

(65) Prior Publication Data

US 2024/0118965 A1 Apr. 11, 2024

(51) Int. Cl.
*G06F 11/07* (2006.01)
(52) U.S. Cl.
CPC ........ *G06F 11/079* (2013.01); *G06F 11/0712* (2013.01)
(58) Field of Classification Search
CPC ............. G06F 11/0706; G06F 11/0712; G06F 11/0751; G06F 11/079; G06F 11/0793
See application file for complete search history.

(56) References Cited

U.S. PATENT DOCUMENTS

| | | | | |
|---|---|---|---|---|
| 9,298,525 B2* | 3/2016 | Zhu | ..................... | G06Q 10/0639 |
| 9,323,599 B1* | 4/2016 | Iyer | ......................... | G06F 11/30 |
| 9,772,898 B2* | 9/2017 | Deshpande | ......... | H04L 41/0631 |
| 2020/0159600 A1* | 5/2020 | Thakore | ............... | G06F 11/3476 |
| 2021/0165704 A1* | 6/2021 | Savir | ..................... | G06F 11/079 |

OTHER PUBLICATIONS

Zhao, et al., "Multivariate Time-series Anomaly Detection via Graph Attention Network," Available Online at: https://arxiv.org/abs/2009.02040, Sep. 4, 2020, 10 pages.

Yen, et al., "Graph Neural Network based Root Cause Analysis Using Multivariate Time-series KPIs for Wireless Networks," Available Online at: https://colouryen.github.io/pub/NOMS2022_draft.pdf, Apr. 25, 2022, 8 pages.

* cited by examiner

*Primary Examiner* — Joseph R Kudirka
(74) *Attorney, Agent, or Firm* — Kilpatrick Townsend & Stockton LLP

(57) ABSTRACT

Techniques are described for identifying root cause anomalies in time series. Information to be used for root cause analysis (RCA) is obtained from a graph neural network (GNN) and is used to construct a dependency graph having nodes corresponding to each time series and directed edges corresponding to dependencies between the time series. Nodes corresponding to time series that do not contain anomalies may be removed from this dependency graph, as well as edges connected to these nodes. This edge and node removal may result in the creation of one or more sub-graphs from the dependency graph. A root cause analysis algorithm may be run on these one or more sub-graphs to create a root cause graph for each sub-graph. These root cause graphs may then be used to identify root cause anomalies within the multiple time series, as well as sequences of anomalies within the multiple time series.

20 Claims, 11 Drawing Sheets

IDENTIFYING ROOT CAUSE ANOMALIES IN TIME SERIES

BACKGROUND

Monitoring is often performed of components implemented within a wide range of industries, such as manufacturing, transportation, utilities, etc. These monitors (such as meters, probes, diagnostic tools, etc.) often report data associated with the operation of those components, where the data takes the form of time series (such as signals that are received over a predetermined period of time). Time series can include data that are time-dependent (e.g., that are organized/indexed according to time, etc.).

Given these time series as input, it is desirable to determine whether any anomalies exist within the time series. For example, it may be desirable to determine whether a time series produced for a component represents the normal functioning of that component. If an anomaly (such as one or more unexpected values) is discovered within the time series, such anomaly can indicate that the component being monitored is not functioning correctly and needs to be updated, fixed, replaced, etc.

Within a group of multiple different time series originating from a group of different monitors/components within a single system, it is also desirable to identify root cause anomalies, as well as dependencies between such anomalies. For example, by identifying a root cause anomaly within a time series, it may be determined that such anomaly influences/contributes to other anomalies within other time series of the group. Resolving this root cause anomaly may therefore automatically resolve other anomalies within other time series. However, current analysis methods are unable to automatically identify such "root cause anomalies" or sequences of anomalies within groups.

BRIEF SUMMARY

The present disclosure relates generally to time series analysis. More particularly, novel techniques are described for determining both root cause anomalies, as well as one or more sequences of anomalies, within a group of time series. Various embodiments are described herein to illustrate various features. These embodiments include various methods, systems, non-transitory computer-readable storage media storing programs, code, or instructions executable by one or more processors, and the like.

According to certain implementations, information to be used for root cause analysis (RCA) is obtained from a graph neural network (GNN). The GNN may take multiple time series as input and may identify, for each time series, whether the time series contains an anomaly. The information obtained from the GNN may include identifiers of each time series, an indication, for each time series, as to whether the time series contains an anomaly, dependencies between time series, and weights indicating a strength of such dependencies. This information is used to construct a dependency graph having nodes corresponding to each time series and directed edges corresponding to dependencies between the time series.

Nodes corresponding to time series that do not contain anomalies may be removed from this dependency graph; edges connected to these nodes may be removed as well. Additional edges may also be removed from the dependency graph that have weights falling below a predetermined threshold. This edge and node removal may result in the creation of one or more sub-graphs from the dependency graph. A root cause analysis algorithm (such as Edmond's Algorithm) may be run on these one or more sub-graphs to create a root cause tree for each sub-graph. These root cause trees may then be used to identify root cause anomalies within the multiple time series, as well as sequences of anomalies within the multiple time series.

At least one embodiment is directed to a computer-implemented method. The method may include, for a data structure comprising a plurality of nodes and a plurality of directed edges, each of the plurality of nodes representing a time series and the plurality of directed edges representing dependencies between the time series, removing from the data structure, by a computer system, one or more nodes representing time series in which no anomalies are found, as well as directed edges associated with those nodes, to create one or more sub-data structures, and for a first sub-data structure comprising multiple nodes, applying, by the computer system, a root cause analysis (RCA) algorithm to the first sub-data structure to determine a root cause sub-data structure, and identifying, by the computer system, a root cause anomaly within a time series corresponding to a root node of the root cause sub-data structure.

Another embodiment is directed to a computer-implemented method. The method may include, for a data structure comprising a plurality of nodes and a plurality of directed edges, each of the plurality of nodes representing a time series and the plurality of directed edges representing dependencies between the time series, removing from the data structure, by a computer system, one or more nodes representing time series in which no anomalies are found, directed edges associated with those nodes, and one or more additional directed edges each having an associated strength value less than a predetermined threshold amount to create one or more sub-data structures, and for a first sub-data structure comprising multiple nodes, applying, by the computer system, a root cause analysis (RCA) algorithm to the first sub-data structure to determine a root cause sub-data structure, and identifying, by the computer system, a root cause anomaly within a time series corresponding to a root node of the root cause sub-data structure.

Another embodiment is directed to a computing device comprising one or more processors and instructions that, when executed by the one or more processors, cause the computing device to perform any suitable combination of the method(s) disclosed herein.

Still another embodiment is directed to a non-transitory computer-readable medium storing computer-executable instructions that, when executed by one or more processors of a computing cluster, cause the computing cluster to perform any suitable combination of the method(s) disclosed herein.

The foregoing, together with other features and embodiments will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
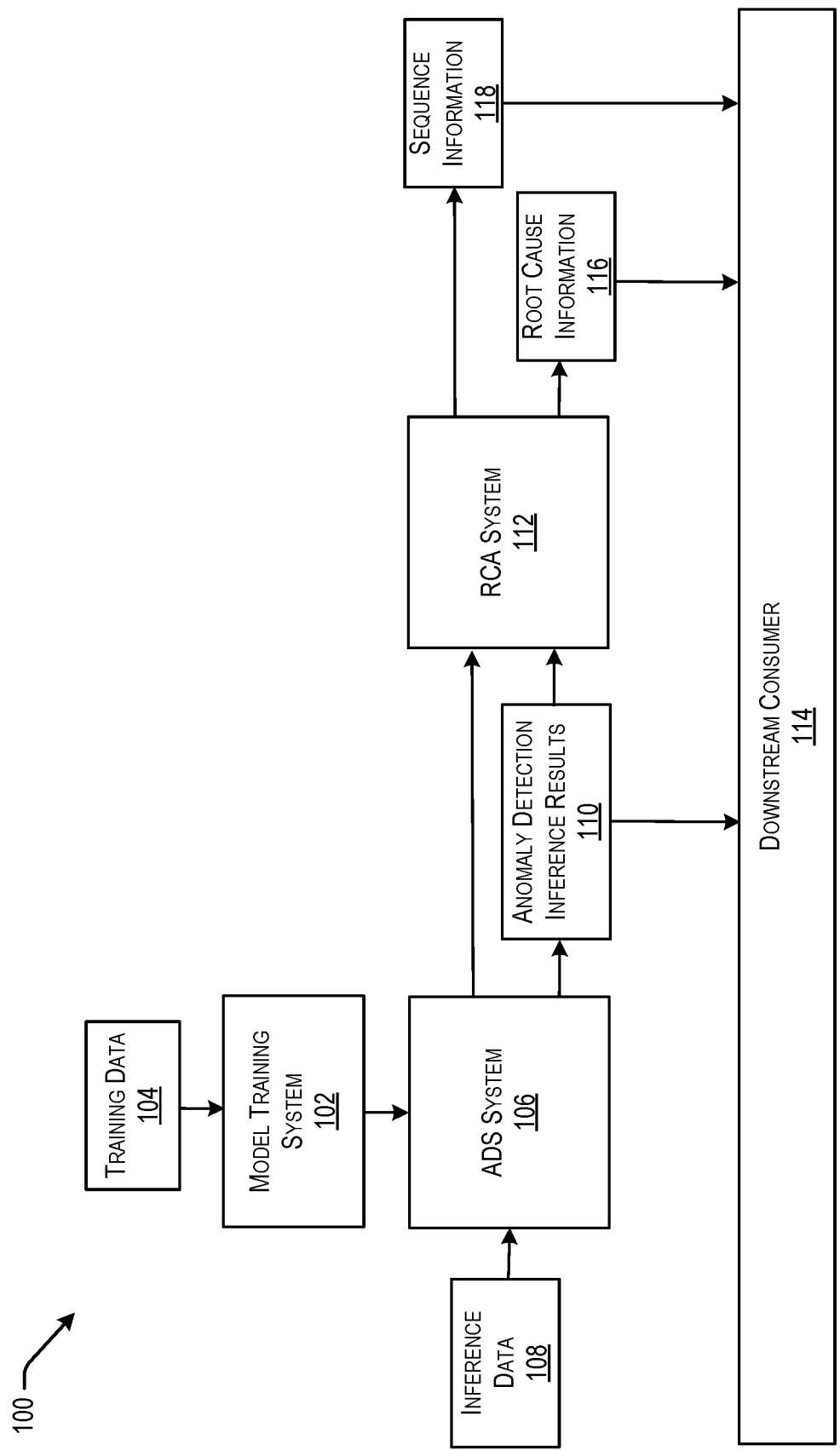
FIG. 1 is a block diagram of an explainable anomaly detection environment, according to at least one embodiment.

In the following description, for the purposes of explanation, specific details are set forth in order to provide a thorough understanding of certain embodiments. However, it will be apparent that various embodiments may be practiced without these specific details. The FIGS. and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Given time series as input, systems can analyze such time series to determine whether any anomalies exist within the time series. For example, a time series produced by the monitoring of a component can be analyzed to determine if such data represents the normal functioning of that component. If an anomaly (such as one or more unexpected values) is discovered within the data, such anomaly can indicate that the component being monitored is not functioning correctly and needs to be updated, fixed, replaced, etc.

A group of multiple different time series originating from a group of different monitors/components within a single system may be analyzed in order to identify any anomalies within such time series. However, current analysis methods are unable to identify causation or dependencies between anomalies within the group. For example, current analysis methods are unable to determine a root cause anomaly within a first time series of a group that influences/contributes to other anomalies within other time series of the group.

To address this problem, a graph neural network (a class of neural network for processing data represented by graph data structures) can be trained to identify anomalies within a group of time series. For each of an input group of time series, the graph neural network can indicate whether the time series contains an anomaly. These results, as well as other information from the graph neural network (e.g., layers within the graph neural network and weights assigned to those layers) are used to construct a dependency graph. The dependency graph includes a directed graph having a plurality of nodes (each representing one of the time series) and directed edges between the nodes (each representing dependencies between connected nodes). Each node can include an indication as to whether the corresponding time series contains an anomaly, and each directed edge can include a value indicating a strength of the corresponding dependency.

This dependency graph can be adjusted to remove any nodes that do not contain anomalies, as well as any directed edged connected to those removed nodes. Additional edges having values falling below a predetermined threshold can be removed as well. This can result in one or more sub-graphs. A root cause analysis (RCA) algorithm (such as Edmond's Algorithm) can then be run on each sub-graph to determine root cause trees for each sub-graph. These root cause trees clearly indicate root cause anomalies as well as sequences of anomalies within the time series.

As such, the root cause trees can then be used to identify root cause anomalies within the time series, as well as a sequence of the anomalies within the time series. The identification of these root cause anomalies, as well as the sequence of such anomalies, can be provided as a service to one or more tenants via a cloud service provider (such as a cloud infrastructure as a service (IaaS) system).

Anomaly detection in time series signals for prognostic surveillance and predictive maintenance is increasingly adopted in a wide range of applications and industries such as Internet-of-Things (IoT), Oil & Gas, manufacturing, transportation, utilities and so forth. One drawback of existing anomaly detection systems, however, is lack of actionable system output and explainability where identification of the main influencer or contributor to anomaly events can help reduce the time taken to diagnose such events.

In many predictive maintenance use cases, the scale and complexity of the system necessitates the need for automatically identifying potential influencers, i.e. signals contributing to an anomaly event. For example, in IoT industries a large number of smart sensors are deployed for monitoring critical assets. In a multivariate time series setting, where there are multiple time series, there is relationship and correlation between the multiple time series because of the common underlying processes governing the behavior of the system. Such relationships between signals can be complex and in many use cases may not follow a linear pattern. Deep learning-based methods, specifically Graph Neural Networks (GNNs), have shown to be successful methods in modeling graph-structured data. In fact, GNNs can better capture complex relationships between multiple signals in a multivariate setting. An exemplary method for anomaly explainability in time series can be implemented by combining a GNN for detecting anomalies with a graph search algorithm.

Many existing anomaly diagnosis methods are reliant on domain knowledge and expertise. In various embodiments, a data-driven algorithmic approach to anomaly diagnosis can automate the process of identifying potential anomaly root causes in order to provide an actionable outcome. Graph neural networks are effective in modelling complex patterns in graph structured data. One exemplary model learns to capture the correlation structure, i.e., the dependency/relationship between multiple time series. In this setting each node/vertex of the GNN model represents one time series and an edge between two nodes represents dependency (likelihood score) between the two time series. The dependency score indicates that one time series/signal is used for modeling another time series.

In various embodiments, a method can utilize a GNN trained on historical time series. A sliding window mechanism can be used for both training and inference/detection. The trained GNN along with anomaly detection results can then be used to identify potential contributors to each anomaly event.

To find the root cause(s) of an anomaly event, a GNN-based model (e.g., a multivariate anomaly detection at Oracle (MADORA) model, etc.) is trained on historical data in an unsupervised fashion. The data can be relatively anomaly-free so that the GNN learns the normal behavior of the system and relationships between signals used for monitoring an asset. Training is done by creating a window input for time series and sliding the window in time. The GNN graph is a directed graph (digraph) called the dependency graph as it captures the relationship between multiple signals as a result of training a graph neural network.

In the dependency graph, a node represents a signal, and an edge represents dependency relationships (dependency score) between the two signals. An edge between two signals indicates that one signal is used for modeling the other one. Corresponding to the dependency graph there is an adjacency matrix A where Aij represents the presence of a directed edge from node i to node j. The dependency graph is used for explaining anomalies and their potential root causes. A domain expert can enforce a particular dependency structure by freezing the values of the adjacency matrix.

In various embodiments, a dependency graph can be constructed based on the output of a trained GNN, with dependency scores on each edge. An updated graph is produced by removing all the anomaly-free nodes/signals along with the edges connected to them. Finally, using an exemplary algorithmic method, multiple trees are generated, and potential root causes of anomalous signals can be identified automatically using the trees.

More specifically, the dependency graph is used to find the potential sequence of anomaly events due to a single or multiple root cause anomalies. It can be noted that at a given point in time the most probable scenario is for a single point of failure to propagate through the system. Also, if there is more than one cause for a failure, the one with the highest importance (e.g., aggregated dependency score) is selected as the main cause.

One exemplary algorithm for finding explainable anomaly sequences can include the following steps:
1. Remove all the vertices corresponding to time series where no anomaly is detected over the detection window to obtain a refined dependency graph.
2. Define a dependency score threshold and prune the refined dependency graph by removing any edges whose dependency score is less than the threshold. Through this process the original dependency graph can decompose into multiple components.
3. For each component graph generated in step 2:

Apply Edmond's Algorithm to find a spanning arborescence tree of maximum weight (indegree 1 per each signal node). Note that an arborescence graph is a directed rooted tree in which all edges point away from the root, i.e., the anomaly root cause.

The complexity of the proposed algorithm for identifying the root cause of anomalous events when applied to a dependency graph with N detected anomalies can be calculated as follows:

$$O(N+N \log N)$$

where N is the number of anomalous signals detected over a detection window, and E is the number of edges after pruning.

With this method, instead of building a dependency graph that requires expert knowledge, the dependency graph and the relationship between time series signals are learned from the available data. The GNN based learning is flexible in that expert knowledge can be incorporated into the learning process, i.e., if there should be no relationship between a pair of signals that can be enforced in the adjacency matrix. This method provides an automatic root cause detection which is applicable to a large number of time series during inferencing. Additional non-time series information that includes potential contributors like weather data, and metadata information like asset hierarchy can also be incorporated into the GNN learning process by converting such information into time series data.

FIG. 1 is a block diagram of an explainable anomaly detection environment 100, according to one exemplary embodiment. In various embodiments, the explainable anomaly detection environment 100 can be provided by a cloud service provider (such as a cloud infrastructure as a service system). For example, the cloud service provider can provide an anomaly detection service that is implemented by the explainable anomaly detection environment 100. As shown, training data 104 is provided as input to a model training system 102. In various embodiments, the model training system 102 can train a graph neural network (GNN), utilizing the training data 104. For example, the graph neural network can include a class of neural network for processing data represented by graph data structures. In another example, the graph neural network can include one or more graph attention networks (GATs), where each of the one or more GATs can implement attention (e.g., selective focus within the graph neural network implemented utilizing adjustable weights).

Additionally, in various embodiments, the training data 104 can include a plurality of historical time series within a system. For example, time series can include instances of data (such as data points) that are time-dependent (e.g., that are organized/indexed according to time, etc.). The training data can also include an identification of one or more anomalous events within the time series.

Further, the model training system 104 can train the GNN to assign a predetermined anomaly score to input time series. The GNN can also include a plurality of layers, where each layer indicates a dependency of one time series to another time series. The model training system 104 can also train the GNN to assign a weight to each layer indicating a magnitude of the dependency represented by that layer.

After the GNN has been trained by the model training system 102, the trained GNN is utilized within an anomaly detection system (ADS) 106 to perform anomaly detection inference on input inference data 108. For example, the ADS 106 can take inference data 108 as input and can perform inference on the received inference data 108, utilizing the trained GNN. The inference data 108 can include a plurality of time series. In various embodiments, each time series can include a signal. In various embodiments, the inference data 108 can include data retrieved from one or more sources (e.g., proves, monitoring applications, etc.) during a predetermined time window.

During the performance of inference by the ADS 106, the ADS 106 can assign a predetermined anomaly score to each time series within the received inference data 108. Additionally, the trained GNN can include a plurality of layers indicative of dependencies between time series, and during the performance of inference, the trained GNN can assign a weight to each layer indicating a magnitude of the dependency represented by that layer. Further, during the performance of inference, the trained GNN can also identify one or more time series as anomalous (e.g., containing one or more anomalies, or unexpected values). For example, the trained GNN can compare the anomaly score for each time series to a predetermined threshold.

Further still, in various embodiments, results 110 of the ADS 106 performing anomaly detection inference on the input inference data 108 can be provided as input into a root cause analysis (RCA) system 112. These results 110 can include an identification of each of the time series within the input inference data 108, as well as an indication, for each time series, as to whether that time series is anomalous. These results 110 are also made available to a downstream consumer 114 (such as a tenant of the cloud service provider, an administrator of the explainable anomaly detection environment 100, one or more third party applications, etc.).

The RCA system 112 can also determine, from GNN utilized within the ADS system 106, additional information including one or more layers within the GNN, as well as a weight assigned to each of the one or more layers. This additional information can be used by the RCA system 112 along with the results 110 to construct a data structure (such as a dependency graph). For example, the dependency graph can include a directed graph having a plurality of nodes and one or more directed edges between the nodes.

In various embodiments, each node within the data structure represents a time series within the inference data 108. Each node within the data structure also includes the identified anomaly score that was assigned by the ADS system 106 to the corresponding time series (or an indication as to whether the corresponding time series has been identified as anomalous).

Also, in various embodiments, each of the directed edges within the data structure are derived from a layer within the trained GNN used within the ADS system 106, where each of the directed edges within the data structure indicates a dependency between time series within the inference data 108. Each directed edge also includes a dependency score corresponding to a weight assigned to the layer within the trained GNN.

Also, the RCA system 112 can identify and remove anomaly free nodes from the data structure. One or more directed edges can also be conditionally removed from the data structure by the RCA system 112. The removal of anomaly free nodes and the conditional removal of directed edges can create one or more sub-data structures (such as sub-graphs, etc.).

In addition, the RCA system 112 can apply a root cause analysis (RCA) algorithm (such as Edmond's Algorithm) to the one or more sub-data structures to determine root cause identification information 116, as well as sequence information 118. For example, the root cause identification information 116 can include an indication of one or more time series that contain initial anomaly events that cause other anomaly events within other time series. The sequence information 118 can include an order in which the anomalies occurred within the time series. The root cause identification information 116 and the sequence information 118 can also be made available to the downstream consumer 114.

Furthermore, by applying the RCA algorithm to the one or more sub-data structures, the RCA system 112 can determine a root cause sub-data structure (such as a spanning arborescence graph of maximum weight) for each of the one or more sub-data structures. This can be performed by first determining, for each of the one or more sub-data structures, one or more spanning arborescence graphs, where a spanning arborescence graph includes a direct rooted graph with all directed edges pointing away from a single root node. The RCA system 112 can also determine a total dependency score for each spanning arborescence graph by summing the dependency scores for all directed edges within the spanning arborescence graph. The RCA system 112 can then determine a spanning arborescence graph of maximum weight for each of the one or more sub-data structures. For each of the one or more sub-data structures, the root node of the spanning arborescence graph of maximum weight for the sub-data structure can identify the time series that contains a root cause anomaly event.

Further still, in various embodiments, for each of the one or more sub-data structures, the spanning arborescence graph of maximum weight determined for that sub-data structure can be analyzed to determine the sequence information 118. For example, a root node can be determined within the spanning arborescence graph of maximum weight, and each directed path from the root node to a leaf node within the root cause graph can be identified as a sequence of anomalous events.

In this way, given a plurality of time series, the explainable anomaly detection environment 100 can identify root cause anomalies within such time series that triggered other anomalies within the time series. The explainable anomaly detection environment 100 can also determine an order in which these anomalies occurred.

Figure 2:
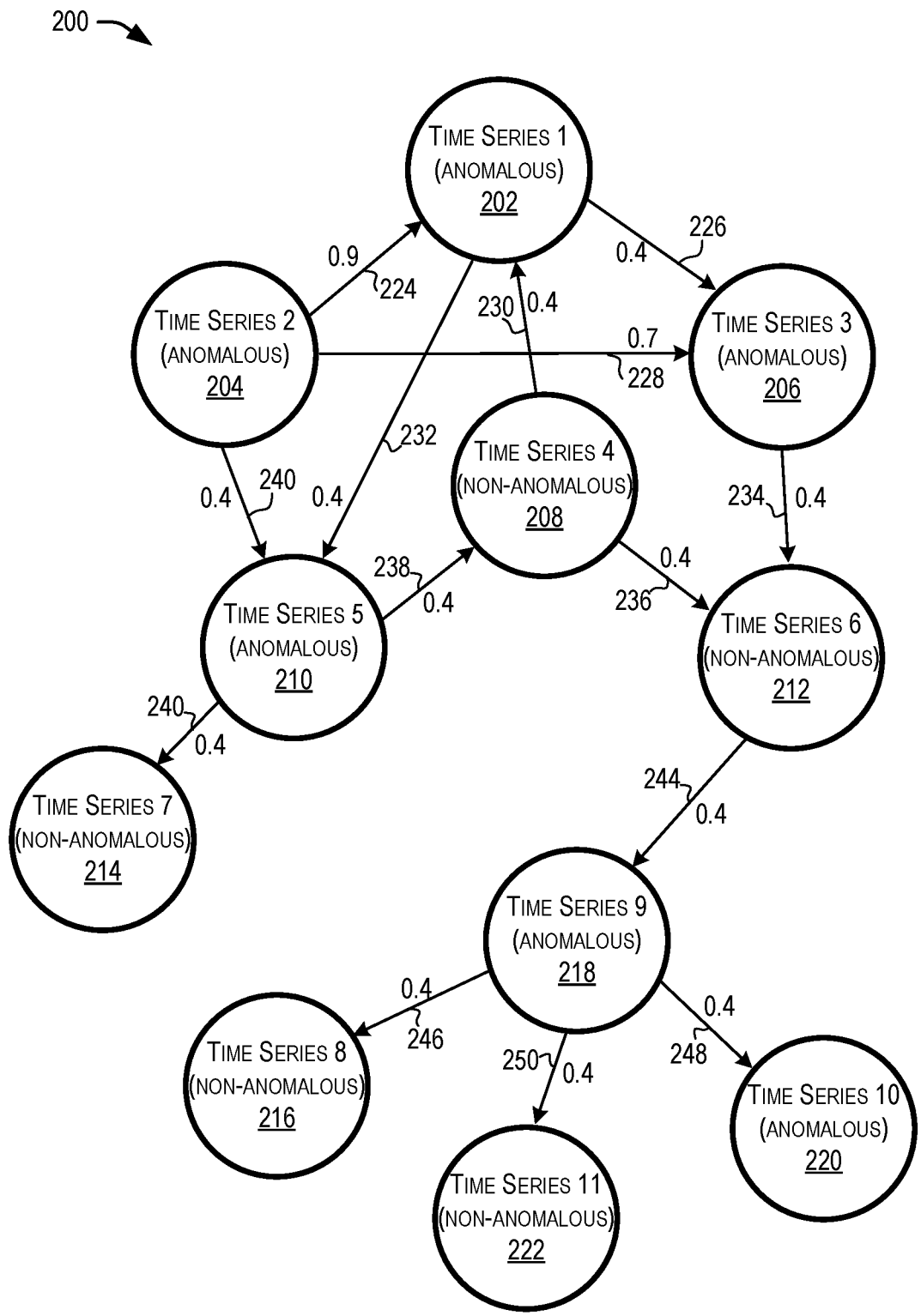
FIG. 2 is a block diagram of an exemplary dependency graph, according to at least one embodiment.

FIG. 2 illustrates an exemplary dependency graph 200 according to one exemplary embodiment. One example of the dependency graph 200 can include the data structure created by the RCA system 112 of FIG. 1. As shown, the dependency graph 200 includes a plurality of nodes 202-222, where each node 202-222 represents an input time series within the inference data 108 that is input into the ADS system 106 of FIG. 1.

Additionally, each node 202-222 within the dependency graph 200 includes an indication as to whether the corresponding time series is identified as anomalous. This identification can be performed by the ADS system 106 of FIG. 1 and can be included in the results 110 of the ADS 106 performing anomaly detection inference on the input inference data 108 in FIG. 1.

Further, each directed edge 224-250 within the dependency graph 200 indicates a dependency between time series represented by the nodes 202-222 that are connected by each directed edge 224-250. Each directed edge 224-250 within the dependency graph 200 also has a corresponding dependency score indicating a magnitude of the dependency between the time series. For example, the directed edge 226 leading from the first node 202 to the third node 206 indicates that the third time series represented by the third node 206 is dependent upon the first time series represented by the first node 202, and that such dependence has a magnitude of 0.4.

Further still, each directed edge 224-250 within the dependency graph 200 can be derived from a layer within the trained GNN used within the ADS system 106 of FIG. 1, and the dependency score assigned to each directed edge 224-250 can correspond to a weight assigned to the layer within the trained GNN used within the ADS system 106 of FIG. 1.

In this way, the nodes 202-222 of the dependency graph 200 can illustrate all input time series and can also indicate whether each time series is anomalous or non-anomalous. The directed edges 224-250 within the dependency graph 200 can indicate dependencies between the input time series, as well as a magnitude of such dependencies.

Figure 3:
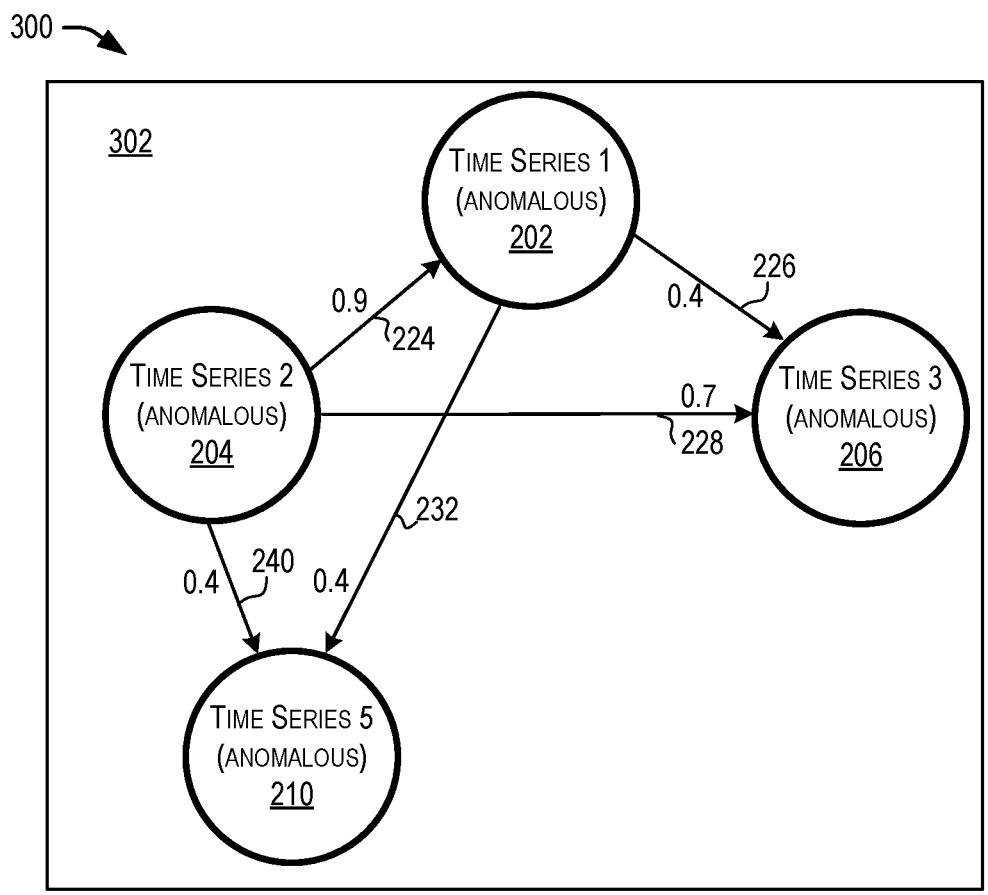
FIG. 3 is a block diagram of a pruned dependency graph resulting from pruning non-anomalous nodes from the dependency graph of FIG. 2, according to at least one embodiment.
Figure 3:
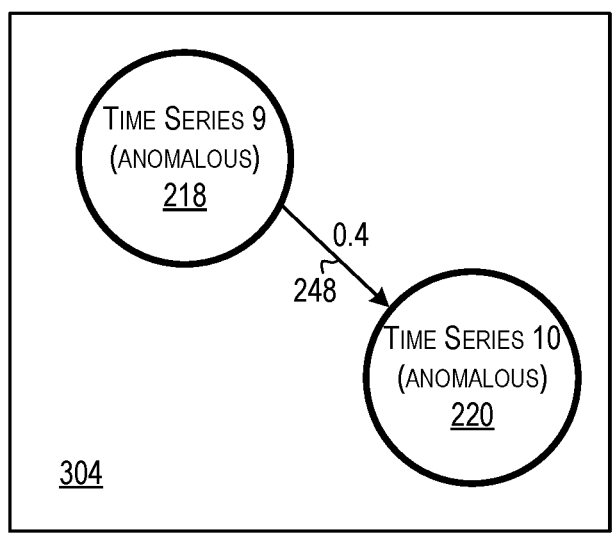

Additionally, FIG. 3 illustrates a pruned dependency graph 300 resulting from pruning non-anomalous nodes from the dependency graph 200 of FIG. 2, according to one exemplary embodiment. For example, this pruning can be performed by the RCA system 112 of FIG. 1. As shown in FIG. 2, the fourth node 208, sixth node 212, seventh node 214, eighth node 216, tenth node 220, and eleventh node 222 all include an indication that the time series corresponding to such nodes are not anomalous. As a result, these nodes, as well as all directed edges connected to these nodes, are removed from the dependency graph 200 of FIG. 2 to create the pruned dependency graph 300.

In various embodiments, each of the nodes 202-222 within the dependency graph 200 of FIG. 2 can include an anomaly score determined by a trained graph neural network (such as the graph neural network utilized by the ADS system 106 of FIG. 1). Each anomaly score can be compared to a predetermined threshold, and nodes having an anomaly score below the predetermined threshold can be removed.

Also, as shown, the pruned dependency graph 300 includes two sub-graphs: a first sub-graph 302 including the first node 202, the second node 204, the third node 206, and the fifth node 210, and a second sub-graph 304 including the ninth node 218 and the tenth node 220.

In this way, the sub-graphs 302 and 304 within the pruned dependency graph 300 can represent only anomalous time series, as well as dependencies between such anomalous time series.

Figure 4:
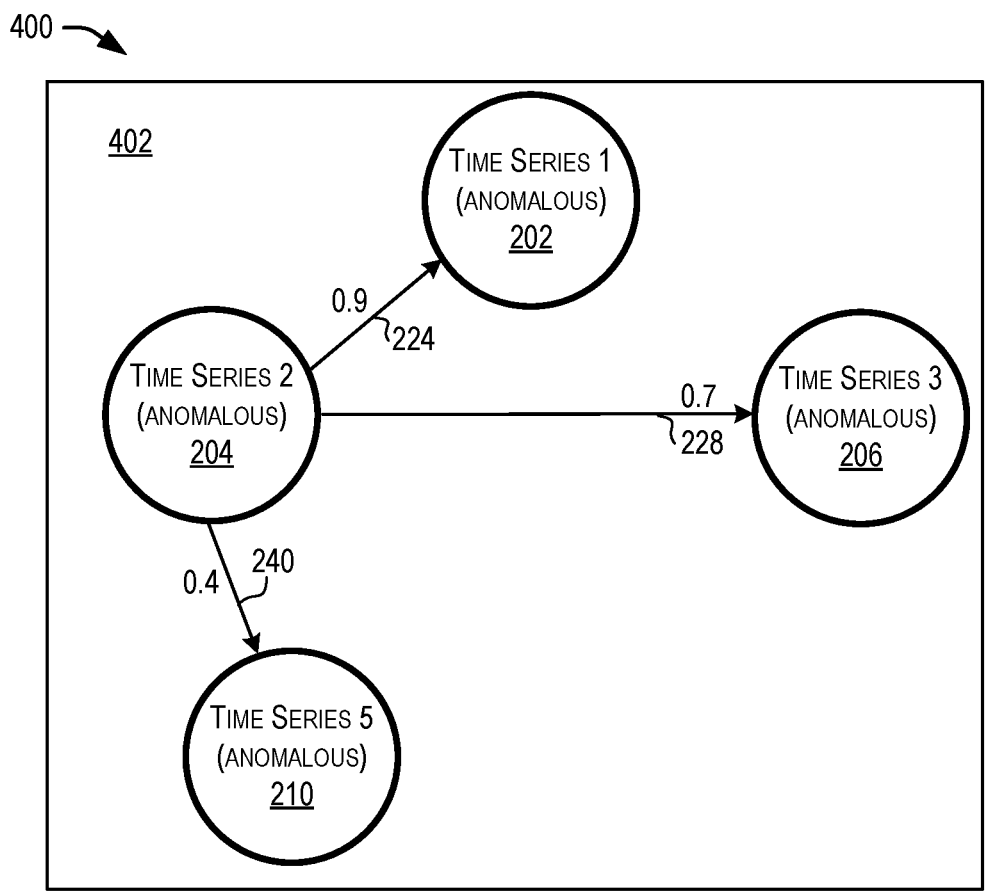
FIG. 4 is a block diagram of a root cause graph resulting from performing root cause analysis within each sub-graph and of the pruned dependency graph of FIG. 3, according to at least one embodiment.
Figure 4:
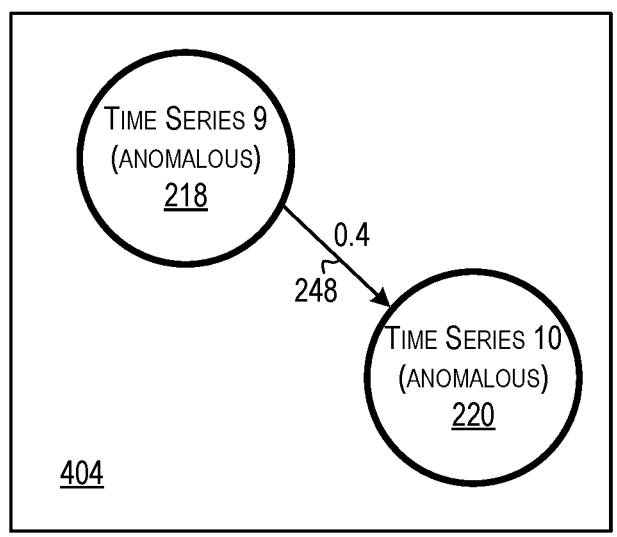

Further, FIG. 4 illustrates a root cause graph 400 resulting from performing root cause analysis within each sub-graph 302 and 304 of the pruned dependency graph 300 of FIG. 3, according to one exemplary embodiment. For example, this root cause analysis can be performed by the RCA system 112 of FIG. 1. In various embodiments, a spanning arborescence graph of maximum weight can be determined within each sub-graph 302 and 304 of FIG. 3.

For example, the performance of root cause analysis within the first sub-graph 302 of FIG. 3 can include determining all spanning arborescence graphs for each sub-graph 302 and 304 of FIG. 3, where a spanning arborescence graph includes a direct rooted graph (e.g., a graph with a single root node) where all directed edges point away from the single root node. For instance, the performance of root cause analysis within the first sub-graph 302 of FIG. 3 can identify a first spanning arborescence graph with the first node 202 as its root, and a second spanning arborescence graph with the second node 204 as its root. The performance of root cause analysis within the second sub-graph 304 of FIG. 3 can identify a third spanning arborescence graph with the ninth node 218 as its root.

Additionally, in various embodiments, the performance of root cause analysis within the first sub-graph 302 of FIG. 3 can also determine a total dependency score for each spanning arborescence graph by summing the dependency scores for all directed edges within the spanning arborescence graph. For example, the total dependency score for the first spanning arborescence graph with the first node 202 as its root can be calculated by summing the value of all directed edges 226 and 232 within the first spanning arborescence graph, for a total dependency score of 0.4+0.4=0.8.

Likewise, the total dependency score for the second spanning arborescence graph with the second node 204 as its root can be calculated by summing the value of all directed edges 224, 228, and 242 within the second spanning arborescence graph, for a total dependency score of 0.9+0.7+ 0.4=2.0. The total dependency score for the third spanning arborescence graph with the ninth node 218 as its root can be calculated by summing the value of all directed edges 248 within the third spanning arborescence graph, for a total dependency score of 0.4.

Further, in various embodiments, the performance of root cause analysis within the first sub-graph 302 of FIG. 3 can also select, within each of the sub-graphs 302 and 304 of FIG. 3, the spanning arborescence graph with the highest total dependency score and can remove all directed edges from the non-selected spanning arborescence graphs. For example, within the first sub-graph 302, the second spanning arborescence graph (having a total dependency score of 2.0) is selected for inclusion within the root cause graph 400 instead of the first spanning arborescence graph (having a total dependency score of 0.8). A result, the directed edges 226 and 232 within the first spanning arborescence graph can be removed to create the first spanning arborescence graph of maximum weight 402 within the root cause graph 400.

Within the second sub-graph 304, the third spanning arborescence graph, having a total dependency score of 0.4, is selected for inclusion within the root cause graph 400 as the second spanning arborescence graph of maximum weight 404 within the root cause graph 400.

Also, in various embodiments, the first root cause sub-graph (e.g., spanning arborescence graph of maximum weight) 402 and the second root cause sub-graph (e.g., spanning arborescence graph of maximum weight) 404 within the root cause graph 400 can be used to determine both root cause identification information (such as the root cause identification information 116 of FIG. 1) as well as sequence information (such as the sequence information 118 of FIG. 1).

For example, as the second node 204 is the root node of the first spanning arborescence graph of maximum weight 402, and the second node 204 represents the second time series, the anomaly events within the second time series is identified as a first root cause of anomaly events associated with the time series represented by the remaining nodes within the first spanning arborescence graph of maximum weight 402. The second time series can thus be included as a root cause within the root cause identification information.

In another example, it can be determined that the anomaly events within the second time series caused the anomaly events of the first time series (represented by the first node 202), as well as the anomaly events of the third time series (represented by the third node 206) and the anomaly events of the fifth time series (represented by the fifth node 210). This determination can be included within the sequence information.

In addition, as the ninth node 218 is the root node of the second spanning arborescence graph of maximum weight 404, and the ninth node 218 represents the ninth time series, the anomaly events within the ninth time series is identified as a second root cause of anomaly events associated with the time series represented by the remaining nodes within the second spanning arborescence graph of maximum weight 404. The ninth time series can thus also be included as a root cause within the root cause identification information.

In another example, it can be determined that the anomaly events within the ninth time series caused the anomaly events of the tenth time series (represented by the tenth node 220). This determination can also be included within the sequence information.

In this way, the root cause graph 400 of FIG. 4 can include an explainable anomaly tree that can be used to identify sequences of anomalous events within the time series represented by the dependency graph 200 of FIG. 2.

Figure 5:
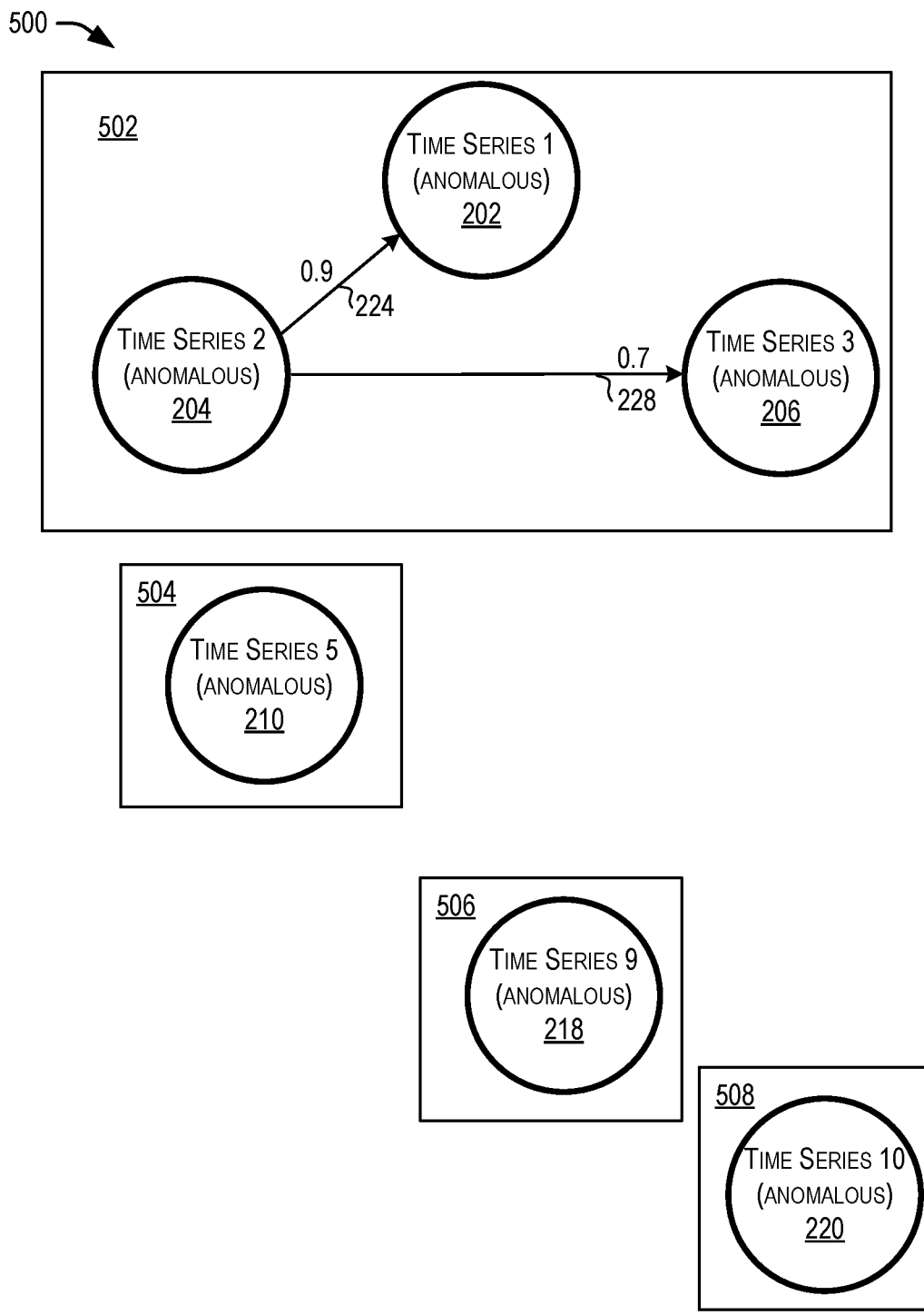
FIG. 5 is a pruned dependency graph resulting from pruning non-anomalous nodes as well as pruning edges with weights falling below a predetermined threshold from the dependency graph of FIG. 2, according to at least one embodiment.

Further still, FIG. 5 illustrates a pruned dependency graph 500 resulting from pruning non-anomalous nodes as well as pruning edges with weights falling below a predetermined threshold from the dependency graph 200 of FIG. 2, according to one exemplary embodiment. For example, this pruning can be performed by the RCA system 112 of FIG. 1. As shown in FIG. 2, the fourth node 208, sixth node 212, seventh node 214, eighth node 216, tenth node 220, and eleventh node 222 all include an indication that the time series corresponding to such nodes are not anomalous. As a result, these nodes, as well as all directed edges connected to these nodes, are removed from the dependency graph 200 of FIG. 2 to create the pruned dependency graph 300.

In various embodiments, each of the nodes 202-222 within the dependency graph 200 of FIG. 2 can include an anomaly score determined by a trained graph neural network (such as the graph neural network utilized by the ADS system 106 of FIG. 1). Each anomaly score can be compared to a predetermined threshold, and nodes having an anomaly score below the predetermined threshold can be removed. Also, the corresponding dependency score of each remaining directed edge within the dependency graph 200 of FIG. 2 is compared to a predetermined threshold (in this example, a value of 0.5, although any numerical value may be used), and directed edges having a dependency score below the predetermined threshold are removed. For a predetermined threshold with a value of 0.5, only edges 224 and 228 have values exceeding the threshold, and therefore only edges 224 and 228 remain.

Also, as shown, the pruned dependency graph 500 includes four sub-graphs: a first sub-graph 502 including the first node 202, the second node 204, and the third node 206; a second sub-graph 504 including the fifth node 210; a third sub-graph 506 including the ninth node 218; and a fourth sub-graph 508 including the tenth node 220.

In this way, the sub-graphs 502-508 within the pruned dependency graph 500 can represent only anomalous time series, as well as dependencies between such anomalous time series having values above a predetermined threshold.

It should also be noted that performing root cause analysis on the sub-graphs 502-508 results in root cause sub-graphs that are the same as sub-graphs 502-508. For example, as the second sub-graph 504, the third sub-graph 506, and the fourth sub-graph 508 each contain only a single node, their respective time series can be included as root causes within the root cause identification information. As the first sub-graph 502 only contains a single root node (the second node 204), the time series corresponding to this node (the second time series) can also be included as a root cause within the root cause identification information.

Further, as the first sub-graph 502 only contains a single root node (the second node 204), it can be determined that the anomaly events within the second time series caused the anomaly events of the first time series (represented by the first node 202), as well as the anomaly events of the third time series (represented by the third node 206). This determination can also be included within the sequence information.

Figure 6:
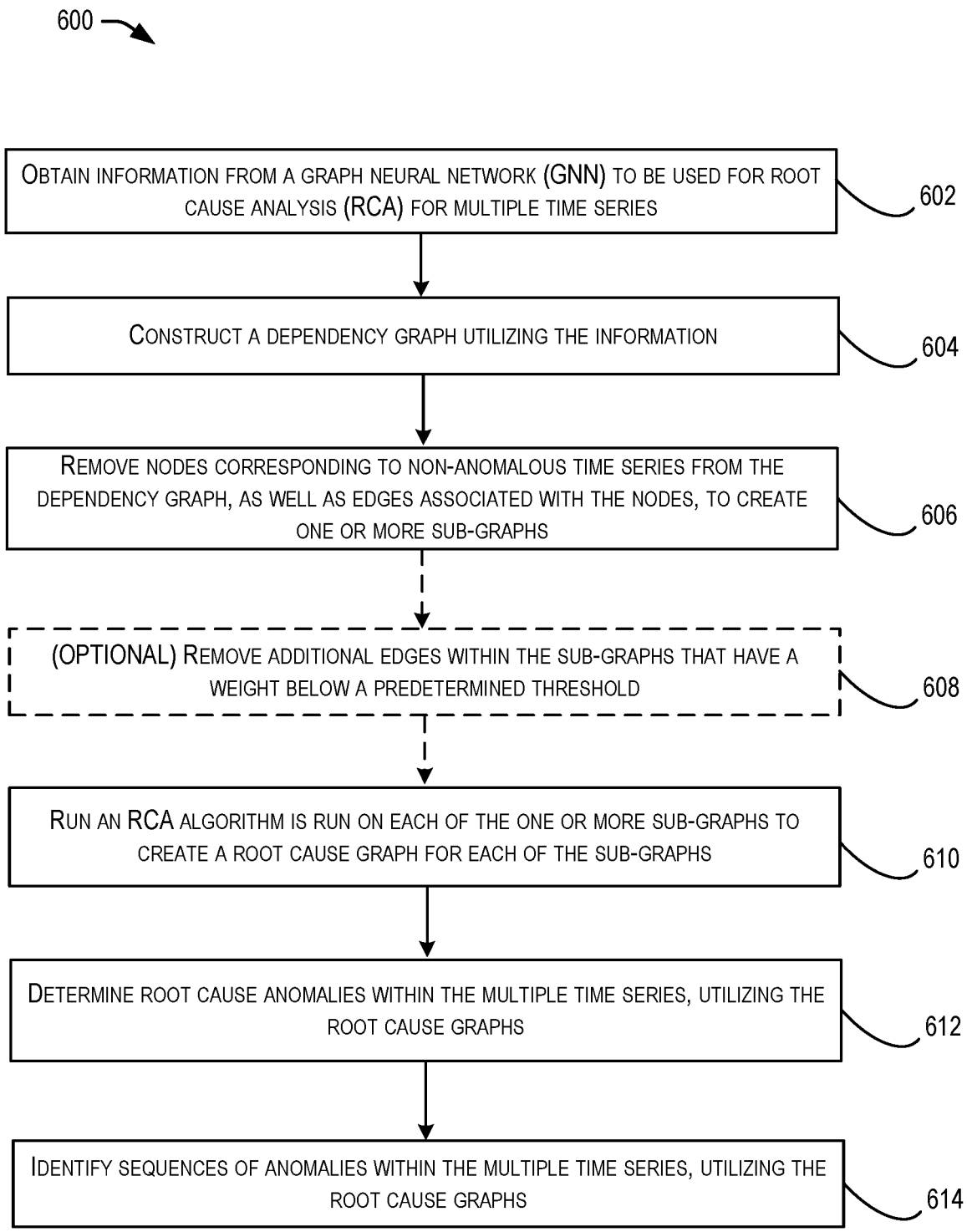
FIG. 6 illustrates an example method for identifying a root cause anomaly within time series, according to at least one embodiment.

FIG. 6 illustrates an example method 600 for identifying a root cause anomaly within time series, according to at least one embodiment. The method 600 may be performed by one or more components of the explainable anomaly detection environment 100 of FIG. 1. A computer-readable storage medium comprising computer-readable instructions that, upon execution by one or more processors of a computing device, cause the computing device to perform the method 600. The method 600 may be performed in any suitable order. It should be appreciated that the method 600 may include a greater number or a lesser number of steps than that depicted in FIG. 6.

The method 600 may begin at 602, where information is obtained from a graph neural network (GNN) to be used for root cause analysis (RCA) for multiple time series. In various embodiments, the GNN can be trained utilizing training data. For example, a graph neural network can include a class of neural network for processing data represented by graph data structures. In another example, the graph neural network can be included within an anomaly detection device. In yet another example, the graph neural network can include one or more graph attention networks (GATs). For instance, each of the one or more GATs can implement attention (e.g., selective focus within the neural network implemented utilizing adjustable weights).

Additionally, in various embodiments, the training data can include time series. For example, each time series can include instances of data (such as data points) that are time-dependent (e.g., that are organized/indexed according to time, etc.). In various embodiments, each of a plurality of time series can include a predetermined signal. For example, each of a plurality of signals can have one or more values at a predetermined point in time. In another example, each time series can include values of a signal over a predetermined time period (e.g., a predetermined historical window of time, etc.).

Further, in various embodiments, the training data can include multiple sources of historical time series produced by one or more systems (e.g., an Internet of Things (IoT) system, a manufacturing system, a utility system, etc.). For example, each source of a time series can produce a signal having one or more values at a predetermined time. In various embodiments, the training data can include an identification of one or more anomalous events within the time series. For example, the training data can include an indication as to which historical time series includes an anomalous event.

In another example, an anomalous event within a time series can include abnormal values within the data when compared to historical or predetermined values. For instance, the abnormal data can have values that are different from expected values for the data at one or more predetermined times. In yet another example, the training data can be represented as a graph data structure within the graph neural network. For instance, the training data can be represented as a directed graph within the graph neural network. In another example, each node within the directed graph can represent a time series input into the graph neural network, and each directed edge within the directed graph can represent a relationship between the nodes connected by the directed edge.

Further still, in various embodiments, during training, the graph neural network can assign a predetermined anomaly score to each time series. In another embodiment, the anomaly score for the time series can represent a probability that the time series has one or more anomalies (e.g., that the time series is abnormal, etc.). In yet another embodiment, the graph neural network can include a plurality of layers. For example, each of the layers can indicate a dependency of onetime series to another time series within the training data. In another example, a layer within the trained graph neural network can represent a dependency of a second time series to a first time series within the training data.

Also, in various embodiments, during training, the graph neural network can assign a weight to each layer indicating a magnitude of the dependency between time series represented by that layer. In various embodiments, the information obtained from the GNN can include results of performing inference on the time series by the trained graph neural network. In various embodiments, the trained graph neural network can receive a plurality of time series as input, where each time series includes a predetermined signal.

In addition, in various embodiments, the time series can be different from the training data. In various embodiments, the time series can include a plurality of instances of data retrieved from one or more sources. For example, each time series can include values of one of a plurality of signals retrieved from one or more sources/systems. In another example, each of the signals can have one or more values at a predetermined point in time.

Furthermore, in various embodiments, the time series can include data retrieved from the one or more sources during a predetermined time window (e.g., for a predetermined time period). For example, given a predetermined time t, the predetermined time window can be represented by (t–n), where n is a predetermined amount of time. In various embodiments, during the performance of inference, the trained graph neural network can assign a predetermined anomaly score to each time series. For example, the anomaly score for a time series can represent a probability that the time series has one or more anomalous events (e.g., that the time series is abnormal, etc.). The results can include these predetermined anomaly scores.

Further still, in various embodiments, the trained graph neural network can include a plurality of layers indicative of dependencies between time series. For example, each of the layers can indicate a dependency of one time series to another time series within the training data. In another example, a layer within the trained graph neural network can represent an existence of a dependency of a second time series to a first time series. The results can include these dependencies indicated by the plurality of layers of the graph neural network.

Also, in various embodiments, during the performance of inference, the trained graph neural network can assign a weight to each layer indicating a magnitude of the dependency between time series represented by that layer. For example, these weights can be represented as attention scores within the trained graph neural network. The results can include these weights assigned to each layer.

Additionally, in various embodiments, during the performance of inference, the trained graph neural network can also identify one or more time series that are identified as anomalous. For example, the results can include the identification of these time series that are identified as anomalous. The results can be retrieved directly or indirectly from the trained graph neural network.

At 604, a dependency graph is constructed, utilizing the information. In various embodiments, the dependency graph can include a directed graph having a plurality of nodes and one or more directed edges between the nodes. In another embodiment, each node within the dependency graph can represent a time series. For example, each node within the dependency graph can indicate one of a plurality of signals corresponding to a time series.

Further still, in various embodiments, the number of nodes within the dependency graph can correspond to a number of time series. In various embodiments, each node within the dependency graph can include an identified anomaly score that was assigned by the trained graph neural network to a corresponding time series. In various embodiments, each node within the dependency graph can include an identified indication as to whether the corresponding time series has been identified by the trained graph neural network as anomalous (e.g., containing an anomalous event). For example, the indication can include a binary value, a flag, etc.

Also, in various embodiments, each of the directed edges within the dependency graph can be derived from a layer within the trained graph neural network. For example, each of one or more layers within the trained graph neural network can be analyzed to determine a dependency between time series that is represented by that layer. These dependencies can be included as directed edges within the dependency graph.

In addition, in various embodiments, each of the directed edges within the dependency graph can indicate a dependency between time series. For example, a directed edge from a first node to a second node can represent a dependency of a second time series (represented by the second node) to a first time series (represented by the first node). In various embodiments, each directed edge can include a dependency score determined by the trained graph neural network. For example, weights assigned by the trained graph neural network to each layer that indicate a magnitude of the dependency between time series represented by that layer can be extracted and assigned to corresponding directed edges within the dependency graph.

Furthermore, in various embodiments, within the dependency graph, a dependency score assigned to directed edge from a first node to a second node can indicate a magnitude of a dependency of a second time series (represented by the second node) to a first time series (represented by the first node).

At 606, nodes corresponding to non-anomalous time series are removed from the dependency graph, as well as edges associated with the nodes, to create one or more sub-graphs. In various embodiments, each node within the dependency graph can include an identified anomaly score. For example, the anomaly score for each node can be compared to a predetermined threshold score, and if the anomaly score for a node does not exceed the predetermined threshold score, the corresponding node (and any directed edges pointing to such node or away from such node) can be removed from the dependency graph.

Also, in various embodiments, each node within the dependency graph can include an identified indication as to whether its corresponding time series has been identified by the trained graph neural network as anomalous. For example, all nodes within the dependency graph that include an indication that their corresponding time series has not been identified by the trained graph neural network as anomalous can be removed from the dependency graph. In another example, all directed edges to such nodes or away from such nodes can also be removed from the dependency graph. In yet another example, all nodes within the dependency graph that include an indication that their corresponding time series has been identified by the trained graph neural network as anomalous can be maintained within the dependency graph.

Additionally, in various embodiments, removing anomaly-free nodes from the dependency graph can result in a plurality of anomalous dependency sub-graphs (e.g., independent anomalous dependency graphs that do not share nodes). In this way, each node within the one or more sub-graphs can be representative of a signal/time series containing an anomalous event.

At 608, additional edges within the sub-graphs that have a weight below a predetermined threshold are removed. For example, dependency scores for each directed edge within the dependency graph can be compared to a predetermined threshold dependency score. The threshold dependency score can be adjustable, can be determined by a user, etc. In another example, directed edges with dependency scores below the predetermined threshold dependency score can be removed from the dependency graph, and directed edges with dependency scores above the predetermined threshold dependency score can be maintained within the dependency graph. In various embodiments, the predetermined threshold dependency score can be adjusted so that a predetermined number of sub-graphs are created.

At 610, a root cause analysis (RCA) algorithm is run on each of the one or more sub-graphs to create a root cause graph for each of the sub-graphs. In various embodiments, the root cause analysis algorithm can include Edmond's Algorithm that determines a root cause graph for each of the one or more sub-graphs. In various embodiments, within each of the one or more sub-graphs, the root cause graph can include a spanning arborescence graph of maximum weight.

For example, the refined dependency graph can be the spanning arborescence graph of maximum weight within each of the one or more sub-graphs. In another example, a plurality of spanning arborescence graphs can be determined for each of the one or more sub-graphs. In yet another example, a spanning arborescence graph can include a direct rooted graph (e.g., a graph with a single root node) where all directed edges point away from the single root node. In still another example, a total dependency score can be determined for each spanning arborescence graph. For instance, the total dependency score can be determined for a spanning arborescence graph by summing the dependency scores for all directed edges within the spanning arborescence graph.

Also, in various embodiments, within each of the one or more sub-graphs, the spanning arborescence graph with the highest total dependency score can be selected as the spanning arborescence graph of maximum weight for that sub-graph. For example, within each of the one or more sub-graphs, the spanning arborescence graph of maximum weight can have the highest likelihood of anomalous event propagation for that sub-graph. In various embodiments, a spanning arborescence graph with the highest total dependency score can be selected for each of the one or more sub-graphs.

At 612, root cause anomalies are determined within the multiple time series, utilizing the root cause graphs. In various embodiments, each node within a root cause graph is representative of an anomalous event within a signal/time series corresponding to the node. In another embodiment, a root node can be determined within each root cause graph. For example, for each node within the root cause graph, the dependency scores for all edges originating at the node (e.g., outgoing edges) can be summed to create a total weight for the node.

Further, in various embodiments, the node having the largest total weight when compared to all nodes within the root cause graph can be identified as the root node of the root cause graph. In various embodiments, anomalies occurring within the time series corresponding to these root nodes can be identified as root cause anomalies within the time series.

At 614, sequences of anomalies are identified within the multiple time series, utilizing the root cause graphs. In various embodiments, within each root cause graph, each directed path from the root node to a leaf node within the graph can be identified as a sequence of anomalous events. For example, a directed path within the refined dependency graph can include a progression of one or more directed edges from the root node to a leaf node within the refined dependency graph.

Also, in various embodiments, each identified sequence of anomalous events can be returned as a sequence of anomalies (e.g., within a list, etc.). For example, within each root cause graph, each identified sequence of anomalies can indicate a progression of anomalous events within the time series, starting with an anomalous event within a first time series corresponding to the root node within the root cause graph, and ending with an anomalous event within an Nth time series corresponding to a leaf node within the root cause graph.

In this way, each identified sequence of anomalous events can indicate a sequence/order of occurrence of anomalous events within the signals/time series, starting with a first anomalous event within a root cause signal/time series and ending with a last anomalous event within another a root cause signal/time series.

Additionally, in various embodiments, a system associated with the root node can be determined. For example, the system can produce the time series corresponding to the root node. In another embodiment, one or more actions can be automatically performed on the determined system. For example, the system can be restarted, updated, repaired, etc.

In this way, anomalous events can be determined within one or more of time series, utilizing a trained graph neural network. Additionally, an order in which these anomalous events occurred can also be determined by performing root cause analysis, and this order can enable the determination of a root cause of such anomalous events.

By determining an order of these anomalous events, and thereby highlighting a root cause of such anomalous events, the need for an independent analysis of each system that produced an anomalous event can be avoided. This reduces an amount of time-to-diagnose and hardware computation required to determine a root cause of these anomalous events, which may improve a performance of one or more hardware computing devices implementing such root cause determination.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be setup. In some instances, the provisioning can be done manually, a provisioning tool may be utilized to provision the resources, and/or deployment tools may be utilized to deploy the code once the infrastructure is provisioned.

Figure 7:
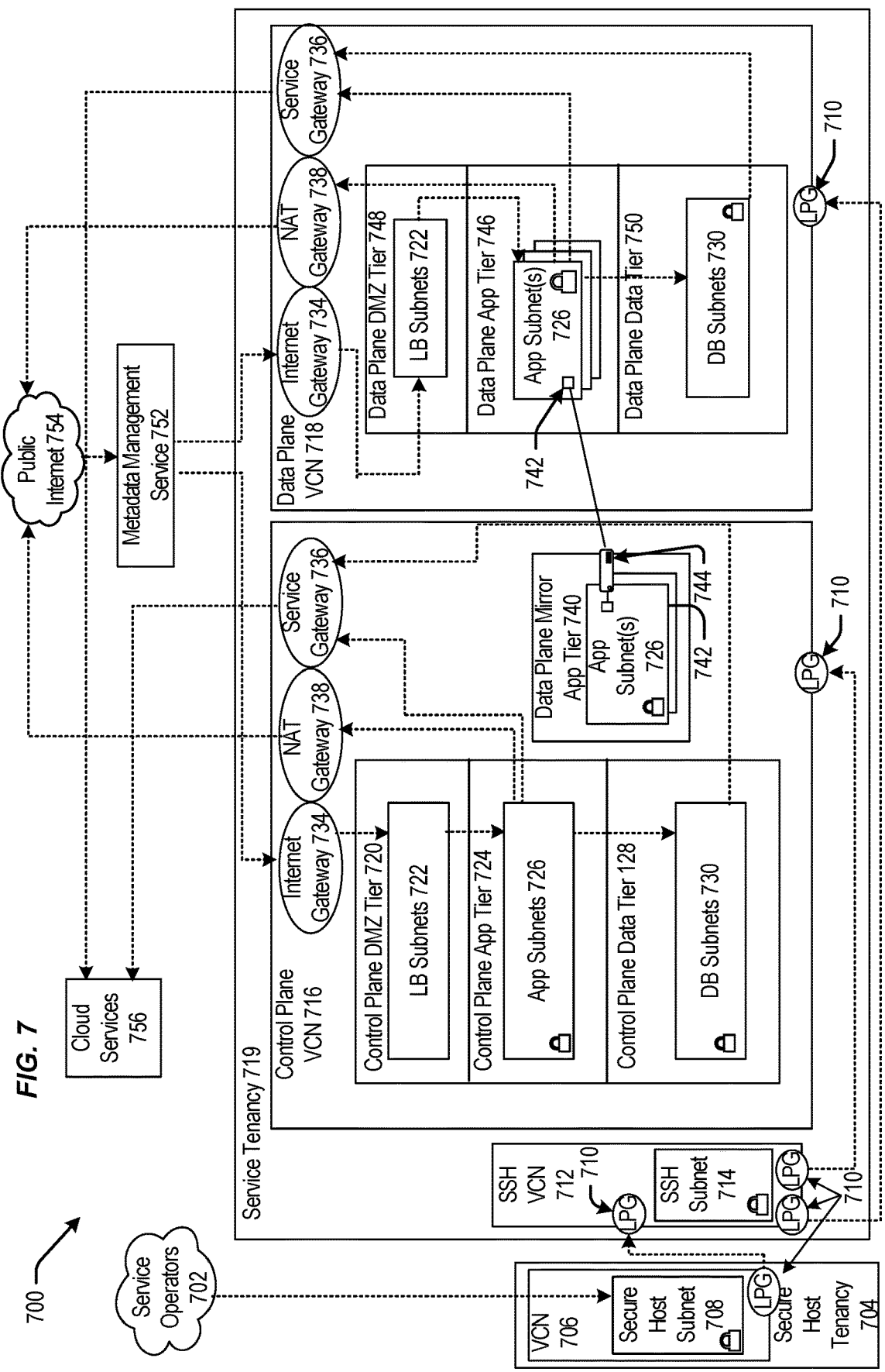
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
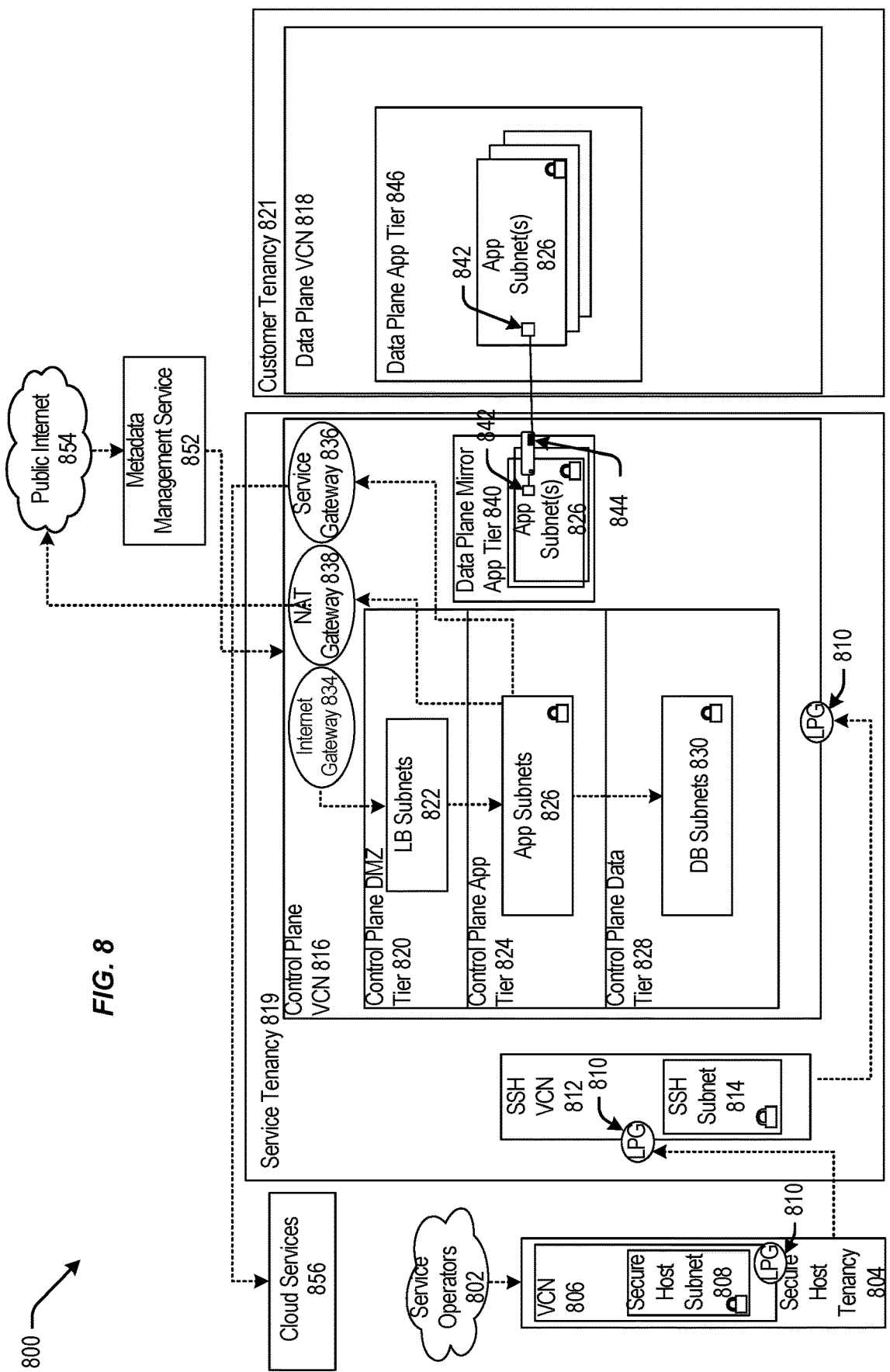
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG.

7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
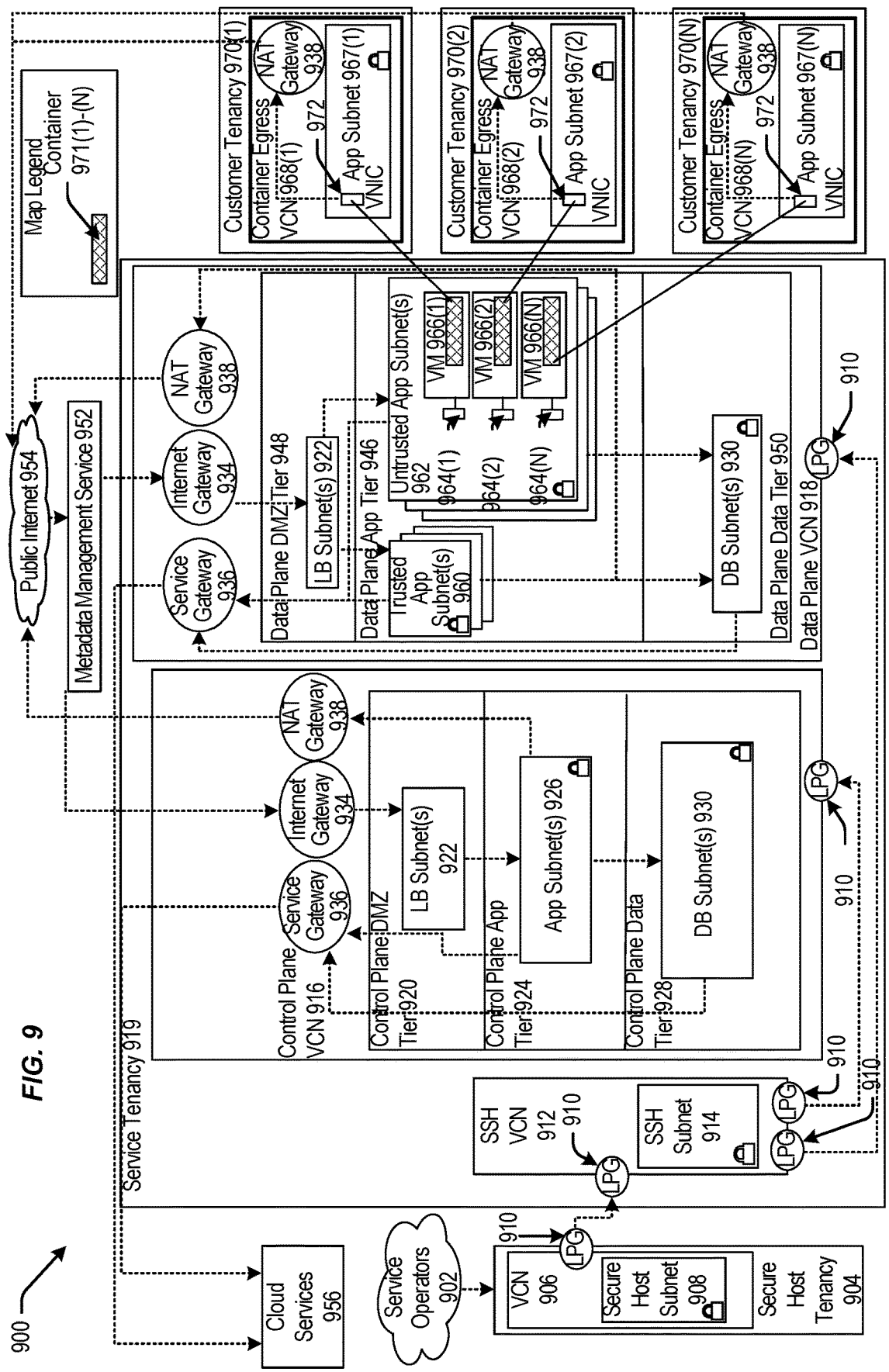
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924

(e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
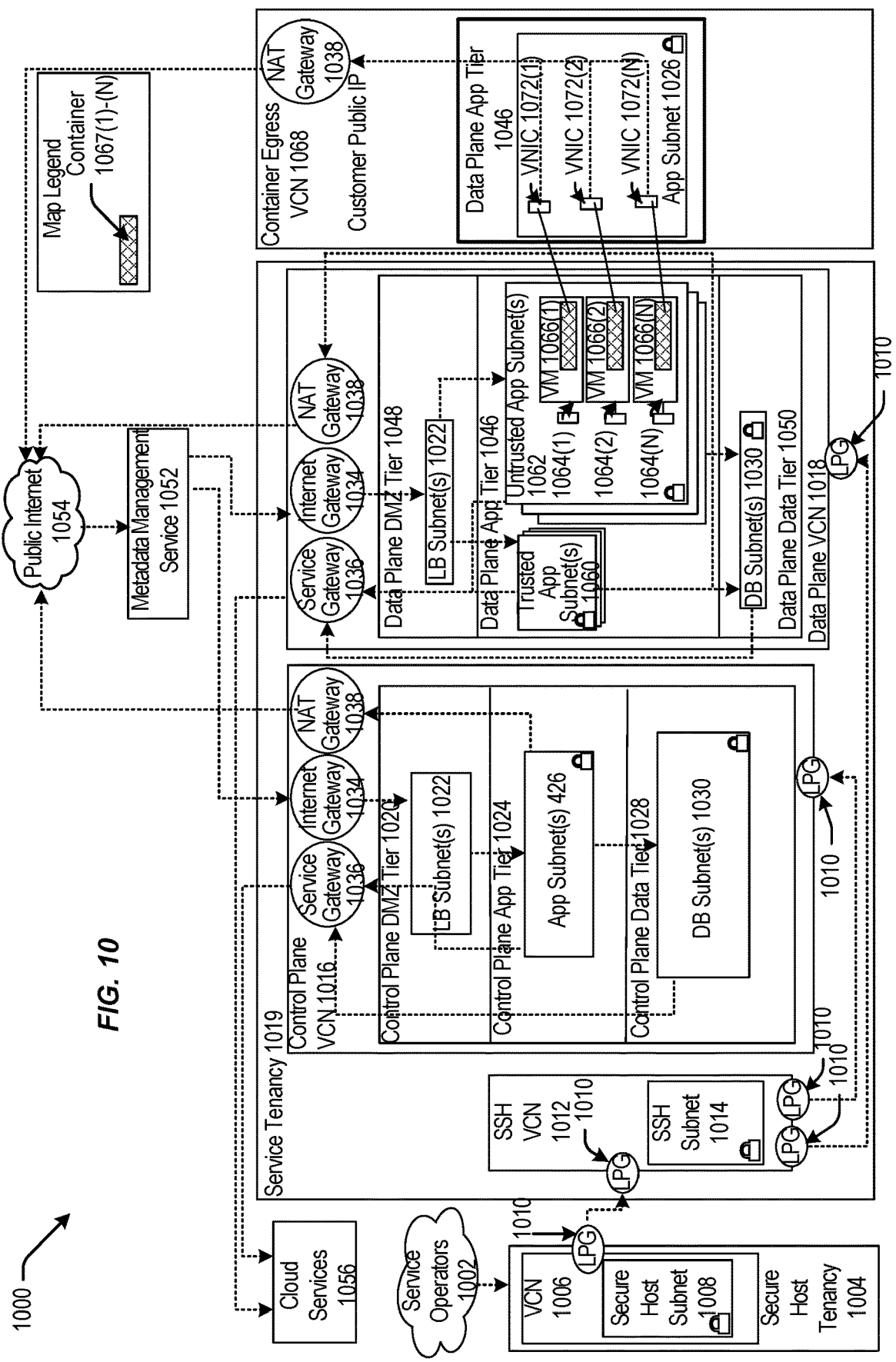
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
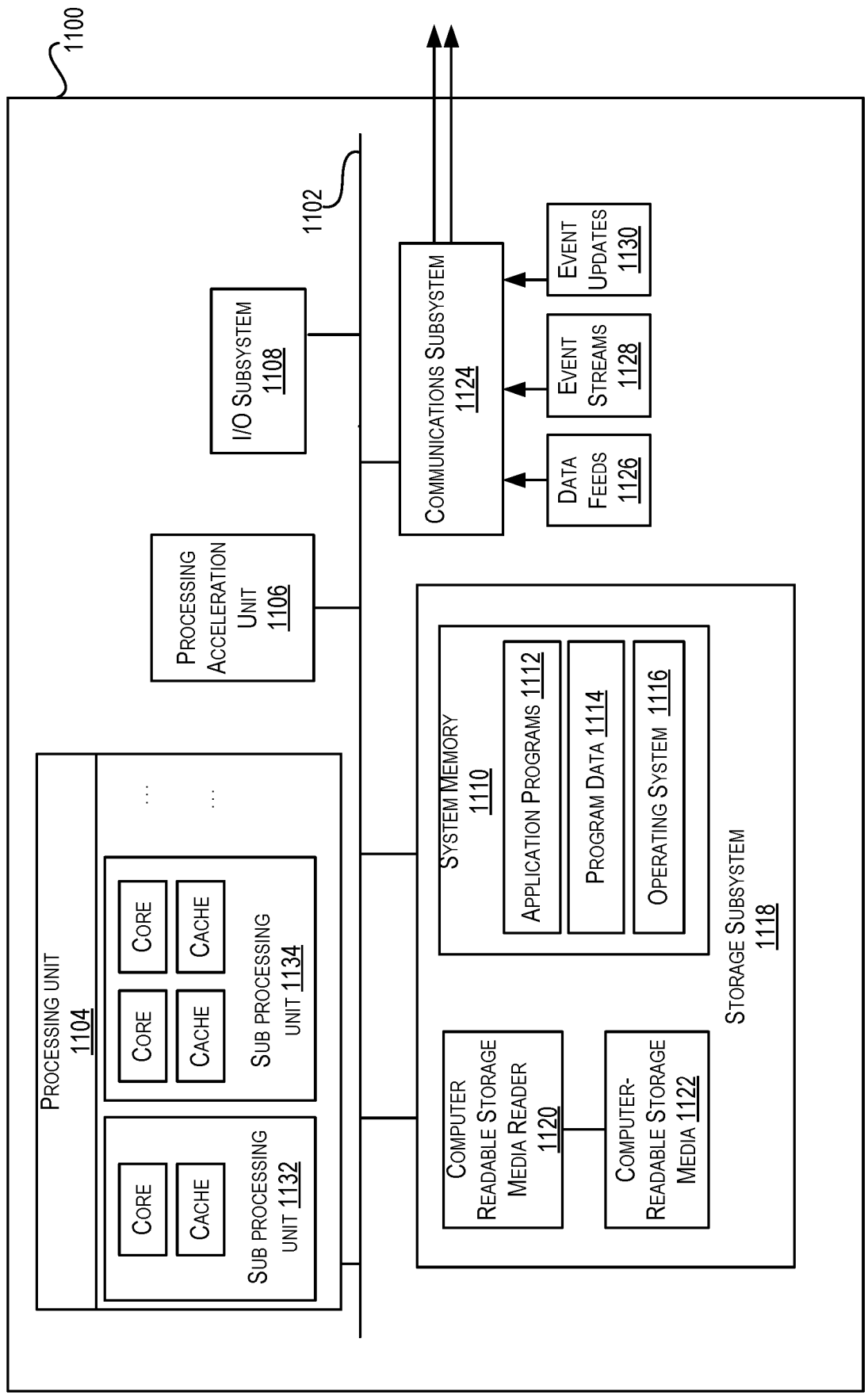
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Sirig navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer-readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    training, by a computer system, a graph neural network (GNN) to generate a trained GNN from training data that includes historical time series data;
    retrieving output from the trained GNN that has performed inference on a plurality of time series, wherein the output includes an indication, for individual ones of the plurality of time series, as to whether the time series contains an anomaly, dependencies between different ones of the plurality of time series, and values indicating a strength of the dependencies;
    generating, by the computer system, a dependency graph based on the output from the GNN, wherein the dependency graph is a data structure comprising a plurality of nodes and a plurality of directed edges, each of the plurality of nodes representing a time series and the plurality of directed edges representing dependencies between the time series;
    removing from the data structure, by the computer system, one or more nodes representing time series in which no anomalies are found, as well as directed edges associated with the one or more nodes, to create one or more sub-data structures; and
    for a first sub-data structure comprising multiple nodes:
    applying, by the computer system, a root cause analysis (RCA) algorithm to the first sub-data structure to determine a root cause sub-data structure;
    identifying, by the computer system, a root cause anomaly within a time series corresponding to a root node of the root cause sub-data structure; and
    resolving the root cause anomaly by automatically repairing a system associated with the root node.

2. The computer-implemented method of claim 1, comprising identifying, by the computer system for the first sub-data structure comprising multiple nodes, one or more sequences of anomalies within the time series, utilizing the root cause sub-data structure, wherein each of the one or more sequences of anomalies corresponds to a directed path from a root node to a leaf node within the root cause sub-data structure.

3. The computer-implemented method of claim 1, wherein the output further comprises an identification of each of the time series.

4. The computer-implemented method of claim 1, comprising constructing, by the computer system, the data structure utilizing the output.

5. The computer-implemented method of claim 1, comprising removing from the data structure, by the computer system, one or more directed edges having associated strength values less than a predetermined threshold amount to create the one or more sub-data structures.

6. The computer-implemented method of claim 1, wherein each of the plurality of nodes within the data structure includes an indication as to whether an anomaly is found within the time series corresponding to that node.

7. The computer-implemented method of claim 1, wherein each of the directed edges within the data structure includes a value representing a strength of the dependency represented by that directed edge.

8. The computer-implemented method of claim 1, wherein the root cause sub-data structure includes a spanning arborescence graph of maximum weight within the first sub-data structure.

9. The computer-implemented method of claim 1, wherein applying the RCA algorithm to the first sub-data structure to determine the root cause sub-data structure includes:
determining, by the computer system, a plurality of spanning arborescence graphs for the first sub-data structure, where each spanning arborescence graph includes a graph with a single root node where all directed edges point away from the single root node;
determining, by the computer system, a total dependency score for each spanning arborescence graph by summing, for each spanning arborescence graph, the dependency scores for all directed edges within that spanning arborescence graph; and
selecting, by the computer system, the spanning arborescence graph with a highest total dependency score as the root cause sub-data structure.

10. A system comprising:
one or more processors configured to:
train a graph neural network (GNN) to generate a trained GNN from training data that includes historical time series data;
retrieve output from the trained GNN that has performed inference on a plurality of time series, wherein the output includes an indication, for individual ones of the plurality of time series, as to whether the time series contains an anomaly, dependencies between different ones of the plurality of time series, and values indicating a strength of the dependencies;
generate a dependency graph based on the output from the GNN, wherein the dependency graph is a data structure comprising a plurality of nodes and a plurality of directed edges, each of the plurality of nodes representing a time series and the plurality of directed edges representing dependencies between the time series;
remove from the data structure one or more nodes representing time series in which no anomalies are found, as well as directed edges associated with the one or more nodes, to create one or more sub-data structures;
for a first sub-data structure comprising multiple nodes:

apply a root cause analysis (RCA) algorithm to the first sub-data structure to determine a root cause sub-data structure;
identify a root cause anomaly within a time series corresponding to a root node of the root cause sub-data structure; and
resolve the identified root cause anomaly by automatically repairing a system associated with the root node.

11. The system of claim 10, wherein the one or more processors are further configured to identify, for the first sub-data structure comprising multiple nodes, one or more sequences of anomalies within the time series, utilizing the root cause sub-data structure, wherein each of the one or more sequences of anomalies corresponds to a directed path from a root node to a leaf node within the root cause sub-data structure.

12. The system of claim 10, wherein wherein the output further comprises an identification of each of the time series.

13. The system of claim 10, wherein the one or more processors are further configured to construct the data structure utilizing the output.

14. The system of claim 10, wherein the one or more processors are further configured to remove from the data structure one or more directed edges having associated strength values less than a predetermined threshold amount to create the one or more sub-data structures.

15. The system of claim 10, wherein for each of the plurality of nodes within the data structure, the node includes an indication as to whether an anomaly is found within the time series corresponding to the node.

16. The system of claim 10, wherein each of the directed edges within the data structure includes a value representing a strength of the dependency represented by that directed edge.

17. The system of claim 10, wherein the root cause sub-data structure includes a spanning arborescence graph of maximum weight within the first sub-data structure.

18. The system of claim 10, wherein applying the RCA algorithm to the first sub-data structure to determine the root cause sub-data structure includes:
determining a plurality of spanning arborescence graphs for the first sub-data structure, where each spanning arborescence graph includes a graph with a single root node where all directed edges point away from the single root node;
determining a total dependency score for each spanning arborescence graph by summing, for each spanning arborescence graph, the dependency scores for all directed edges within that spanning arborescence graph; and
selecting the spanning arborescence graph with a highest total dependency score as the root cause sub-data structure.

19. A computer-implemented method, comprising:
training, by a computer system, a graph neural network (GNN) to generate a trained GNN from training data that includes historical time series data;
retrieving output from the trained GNN that has performed inference on a plurality of time series, wherein the output includes an indication, for individual ones of the plurality of time series, as to whether the time series contains an anomaly, dependencies between different ones of the plurality of time series, and values indicating a strength of the dependencies;
generating, by the computer system, a dependency graph based on the output from the GNN, wherein the dependency graph is a data structure comprising a plurality of nodes and a plurality of directed edges, each of the plurality of nodes representing a time series and the plurality of directed edges representing dependencies between the time series;

removing from the data structure, by the computer system, one or more nodes representing time series in which no anomalies are found, directed edges associated with the one or more nodes, and one or more additional directed edges each having an associated strength value less than a predetermined threshold amount to create one or more sub-data structures; and for a first sub-data structure comprising multiple nodes:

applying, by the computer system, a root cause analysis (RCA) algorithm to the first sub-data structure to determine a root cause sub-data structure;

identifying, by the computer system, a root cause anomaly within a time series corresponding to a root node of the root cause sub-data structure; and resolving the identified root cause anomaly by automatically repairing a system associated with the root node.

20. The computer-implemented method of claim 19, wherein applying the RCA algorithm to the first sub-data structure to determine the root cause sub-data structure includes:

determining, by the computer system, a plurality of spanning arborescence graphs for the first sub-data structure, where each spanning arborescence graph includes a graph with a single root node where all directed edges point away from the single root node;

determining, by the computer system, a total dependency score for each spanning arborescence graph by summing, for each spanning arborescence graph, the dependency scores for all directed edges within that spanning arborescence graph; and selecting, by the computer system, the spanning arborescence graph with a highest total dependency score as the root cause sub-data structure.

\* \* \* \* \*

UNITED STATES PATENT AND TRADEMARK OFFICE
CERTIFICATE OF CORRECTION

PATENT NO. : 12,242,332 B2  
APPLICATION NO. : 17/962869  
DATED : March 4, 2025  
INVENTOR(S) : Ashrafi et al.

It is certified that error appears in the above-identified patent and that said Letters Patent is hereby corrected as shown below:

In the Specification

In Column 3, Line 38, delete "FIGS." and insert -- figures --, therefor.

In Column 5, Line 56, delete "2:" and insert -- 2. --, therefor.

In Column 12, Line 64, delete "onetime" and insert -- one time --, therefor.

In Column 17, Line 66, delete "setup." and insert -- set up. --, therefor.

In Column 27, Line 63, delete "Sirig" and insert -- Siri® --, therefor.

In the Claims

In Column 34, Line 17, in Claim 12, delete "wherein wherein" and insert -- wherein --, therefor.

Signed and Sealed this  
Twenty-fourth Day of June, 2025

Coke Morgan Stewart  
*Acting Director of the United States Patent and Trademark Office*